(12) United States Patent
Stokes

(10) Patent No.: US 7,593,959 B2
(45) **Date of Patent: *Sep. 22, 2009**

(54) COLOR MANAGEMENT SYSTEM THAT SUPPORTS LEGACY AND ADVANCED COLOR MANAGEMENT APPLICATIONS

(75) Inventor: Michael Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 424 days.

This patent is subject to a terminal disclaimer.

(21) Appl. No.: 11/276,244

(22) Filed: Feb. 20, 2006

(65) Prior Publication Data

US 2006/0119609 A1 Jun. 8, 2006

Related U.S. Application Data

(62) Division of application No. 10/705,132, filed on Nov. 10, 2003, now Pat. No. 7,068,284.

(51) Int. Cl.
*G06F 7/00* (2006.01)
*G09G 5/02* (2006.01)

(52) U.S. Cl. ....................................... 707/104; 345/604

(58) Field of Classification Search ................. 345/645; 707/101

See application file for complete search history.

(56) References Cited

U.S. PATENT DOCUMENTS

| | | | | |
|---|---|---|---|---|
| 5,432,906 | A * | 7/1995 | Newman et al. | 345/501 |
| 5,706,501 | A | 1/1998 | Horikiri et al. | |
| 5,838,333 | A * | 11/1998 | Matsuo | 345/604 |
| 6,279,043 | B1 | 8/2001 | Hayward et al. | |
| 6,462,748 | B1 * | 10/2002 | Fushiki et al. | 345/604 |
| 6,603,483 | B1 * | 8/2003 | Newman | 345/593 |
| 6,611,621 | B2 | 8/2003 | Shiraiwa | |
| 6,650,771 | B1 * | 11/2003 | Walker | 382/162 |
| 6,741,262 | B1 * | 5/2004 | Munson et al. | 345/594 |
| 7,068,284 | B2 * | 6/2006 | Stokes | 345/604 |
| 2002/0031256 | A1 * | 3/2002 | Hiramatsu et al. | 382/162 |
| 2002/0067847 | A1 * | 6/2002 | Maltz et al. | 382/162 |
| 2002/0145744 | A1 * | 10/2002 | Kumada et al. | 358/1.9 |
| 2002/0149785 | A1 * | 10/2002 | Chu et al. | 358/1.9 |
| 2002/0196972 | A1 * | 12/2002 | Bayramoglu et al. | 382/167 |
| 2003/0012432 | A1 * | 1/2003 | D'Souza et al. | 382/167 |

(Continued)

OTHER PUBLICATIONS

"Final Office Action", U.S. Appl. No. 11/276 246, (Jan. 23, 2009), 19 pages.

(Continued)

*Primary Examiner*—John R. Cottingham
*Assistant Examiner*—Mohammed R Uddin

(57) ABSTRACT

The present invention provides method and apparatus for supporting a legacy application programming interface (API) set between a component and a color management system. The legacy API set supports both the new capabilities as well as the legacy capabilities. The color management system determines the format type for an object that is referenced by an API call. If the object is associated with a legacy format, the API call is processed by a legacy processing module. If the object is associated with an advanced format, the API call is processed by an advanced processing module. If a plurality of objects is associated with an API call with mixed formats, the color management system converts some of the objects so that the objects have a consistent format. A common structure supports an object that may have either a legacy format or an advanced format.

9 Claims, 13 Drawing Sheets

U.S. PATENT DOCUMENTS

| | | | | |
|---|---|---|---|---|
| 2003/0123723 | A1 * | 7/2003 | D'Souza et al. | 382/162 |
| 2003/0202194 | A1 * | 10/2003 | Torigoe et al. | 358/1.9 |
| 2003/0208691 | A1 * | 11/2003 | Smart et al. | 713/201 |
| 2004/0109179 | A1 * | 6/2004 | Haikin et al. | 358/1.9 |
| 2005/0140694 | A1 * | 6/2005 | Subramanian et al. | 345/619 |
| 2007/0083874 | A1 * | 4/2007 | Vasudevan et al. | 719/328 |
| 2008/0130023 | A1 * | 6/2008 | Perez et al. | 358/1.9 |

OTHER PUBLICATIONS

"Final Office Action", U.S. Appl. No. 11/276 245, (Jan. 26, 2009),19 pages.

D.J. Littlewood, P.A. Drakopoulos and G.Subbarayan, "Pareto-Optimal Formulations for Cost versus Colorimetric Accuracy Trade-Offs in Printer Color Management," ACM Transactions on Graphics, vol. 21, No. 2, Apr. 2002, pp. 132-175.

M.A. Mooney, "Managing Color in Interactive Systems," Sun Microsystems Computer Corp. Tutorial, Apr. 1998, pp. 169-170.

M.C. S tone, W.B. Cowan and J.C. Beatty, "Color Gamut Mapping and the Prining of Digital Color Images," ACM Transactions on Graphics, vol. 7, No. 4, Oct. 1988, pp. 249-292.

"Non Final Office Action", U.S. Appl. No. 11/267,245, (Jun. 9, 2009), 22 pages.

"Non Final Office Action", U.S. Appl. No. 11/276 246, (Jun. 10, 2009), 25 pages.

* cited by examiner

800

COLOR MANAGEMENT SYSTEM THAT SUPPORTS LEGACY AND ADVANCED COLOR MANAGEMENT APPLICATIONS

This application is a divisional of and claims priority to co-pending U.S. application Ser. No. 10/705,132 filed Nov. 10, 2003. The prior application is hereby incorporated by reference in its entirety.

This disclosure is related to the following co-pending applications each of which having the same named inventor and filing date as the present application:

a. U.S. patent application Ser. No. 11/276,245 filed Feb. 20, 2006, entitled "A COLOR MANAGEMENT SYSTEM THAT SUPPORTS LEGACY AND ADVANCED COLOR MANAGEMENT APPLICATIONS".

b. U.S. patent application Ser. No. 11/276,246 filed Feb. 20, 2006 entitled "A COLOR MANAGEMENT SYSTEM THAT SUPPORTS LEGACY AND ADVANCED COLOR MANAGEMENT APPLICATIONS".

FIELD OF THE INVENTION

The present invention relates to color management technology for a computer system, and in particular provides compatibility of a legacy application program interface (API) that supports advanced color management capabilities.

BACKGROUND OF THE INVENTION

With a one-input-one-output workflow, as supported by the prior art, color management was not typically required. Images were typically scanned by a professional operator using a single scanner producing a color representation, e.g., cyan, magenta, yellow, and black (CMYK) format, that was tuned to a single output device. Spot colors were handled either by mixing spot inks or by using standard CMYK formulas in swatch books. An accurate monitor display was not typically available. The system worked because the CMYK values that the scanner produced were tuned for the output device, forming a closed loop that dealt with one set of numbers.

More recently, the types of input and output devices have increased dramatically. Input devices include not only high-end drum scanners but also high-end flatbed scanners, desktop flatbeds, desktop slide scanners, and digital cameras. Output devices include not only web and sheetfeed presses with waterless inks, soy inks, direct-to-plate printing, and Hi-Fi color but also digital proofers, flexography, film recorders, silk screeners, color copiers, laser printers, inkjet printers, and even monitors that function as final output devices. The diversity of input and output devices vastly complicates the approach of a closed workflow as previously discussed. Thus, possible workflows may be associated with a many-to-many mapping of input devices to output devices.

The result is a potentially huge number of possible conversions from input devices to output devices. With an m-input to n-output workflow, one may need m×n different conversions from the input to the output. With the increasing diversity of input and output devices, the task of providing desired color conversions from input to output can easily become unmanageable.

Color management is a solution for managing the different workflows that may be supported between different input device and output device combinations. Color management typically supports an intermediate representation of the desired colors. The intermediate representation is commonly referred as a profile connection space (PCS), which may be alternately referred as a working space. The function of the profile connection space is to serve as a hub for the plurality of device-to-device transformations. With such an approach, the m×n link problem is reduced to m+n links, in which only one link is needed for each device. Each link effectively describes the color reproduction behavior of a device. A link is commonly referred as a device profile. A device profile and the profile connection space are two of the four key components in a color management system.

As based upon current International Color Consortium (ICC) specifications, the four basic components of a color management system are a profile connection space, a set of profiles, a color management module (CMM), and rendering intents. The profile connection space allows the color management system to give a color an unambiguous numerical value in CIE XYZ or CIE LAB color space that does not depend on the quirks of the plurality of devices being used to reproduce the color but instead defines the color as a person actually sees the color. (Both CIE XYZ and CIE LAB are color spaces that are modeled as being device independent.) A profile describes the relationship between a device's RGB (red, green, and blue) or CMYK control signals and the actual colors that the control signals produce. Specifically, a profile defines the CIE XYZ or CIE LAB values that correspond to a given set of RGB or CMYK numbers. A color management module (CMM) is often called the engine of the color management system. The color management module is a piece of software that performs all of the calculations needed to convert the RGB or CMYK values. The color management module works with the color data that is contained in the profiles. Rendering intents includes four different rendering intents. Each type of rendering intent is a different way of dealing with "out-of-gamut" colors, where the output device is not physically capable of reproducing the color that is present in the source space.

As a workflow becomes more complex, color management becomes more important to the user for managing colors of an image file as the image file flows from input (e.g., a scanner) to output (e.g., printer). A workflow utilizes four stages of color management that include defining color meaning, normalizing color, converting color, and proofing. Defining the color meaning includes determining if a profile is embedded in the content and defining a profile if there is no embedded profile. The workflow can then proceed with normalizing color to a working space (corresponding to a device independent color space) or with converting the color representation of the image file directly to the destination space. If the color is normalized to a working space, operations are performed in the working space, e.g., the user modifying selected colors in the working space. A color management system may then build a transformation table from the source profile and the destination profile, using the common values from the working space. Consequently the color management system can convert a source image to a destination image using the transformation table.

A substantial effort, resources, and money may be invested in an application that utilizes capabilities of color management supported by an operating system, in which the application utilizes an application program interface (API) to utilize these capabilities. In order to be competitive in the marketplace and satisfy demands by users, a color management system may be revised, adding new capabilities that can be utilized by the application. However, it is not typically desirable for the legacy application to support an advanced API set to access the new capabilities and enhancements if the application is already using a legacy API set for legacy capabilities and the advanced API set is not compliant with the legacy API set. Doing so would entail a large effort and cost in revising the application.

With the prior art, color management solutions do not typically support legacy applications or solutions when a new version of a color management system with a corresponding new API set is introduced. The new version of the color management system may offer new capabilities, enhancements, and resolutions (fixes) to problems of the legacy version by altering and/or embellishing the legacy API set or by replacing the legacy API set with an advanced API set. If that is the case, the legacy application may not be compatible with the advanced API set and thus not compatible with the new version of the color management system. On the other hand, it may be difficult and costly for the color management system to support both the legacy API set and the advanced API set, considering development and maintenance issues. It would be an advancement in the art to provide compatibility of a legacy API with a new color management solution.

BRIEF SUMMARY OF THE INVENTION

The present invention provides method and apparatus for supporting a legacy application programming interface (API) set between a component (e.g., an application) and a system (e.g., a color management system). With new capabilities and enhancements being offered by the system, the legacy API set supports both the new capabilities and enhancements as well as the legacy capabilities. Consequently, updating and maintaining system software is facilitated because only the legacy API set need be supported rather than a plurality of API sets. Moreover, a legacy application is able to interact with the system using the legacy API set.

With one aspect of the invention, a color management system can support both a legacy application and an advanced application with the legacy API set. The color management system determines a format type for an object that is referenced by an API call. If the object is associated with a legacy format, the API call is processed by a legacy processing module. If the object is associated with an advanced format, the API call is processed by an advanced processing module.

With another aspect of the invention, if a plurality of objects is associated with an API call and if the plurality of objects has mixed formats, the color management system converts some of the objects so that the formats of the objects are consistent. The color management system then performs the requested operation with the objects having a consistent format.

With another aspect of the invention, a common structure supports an object that may have either a legacy format or an advanced format rather than requiring separate structures to support a legacy format and an advanced format.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
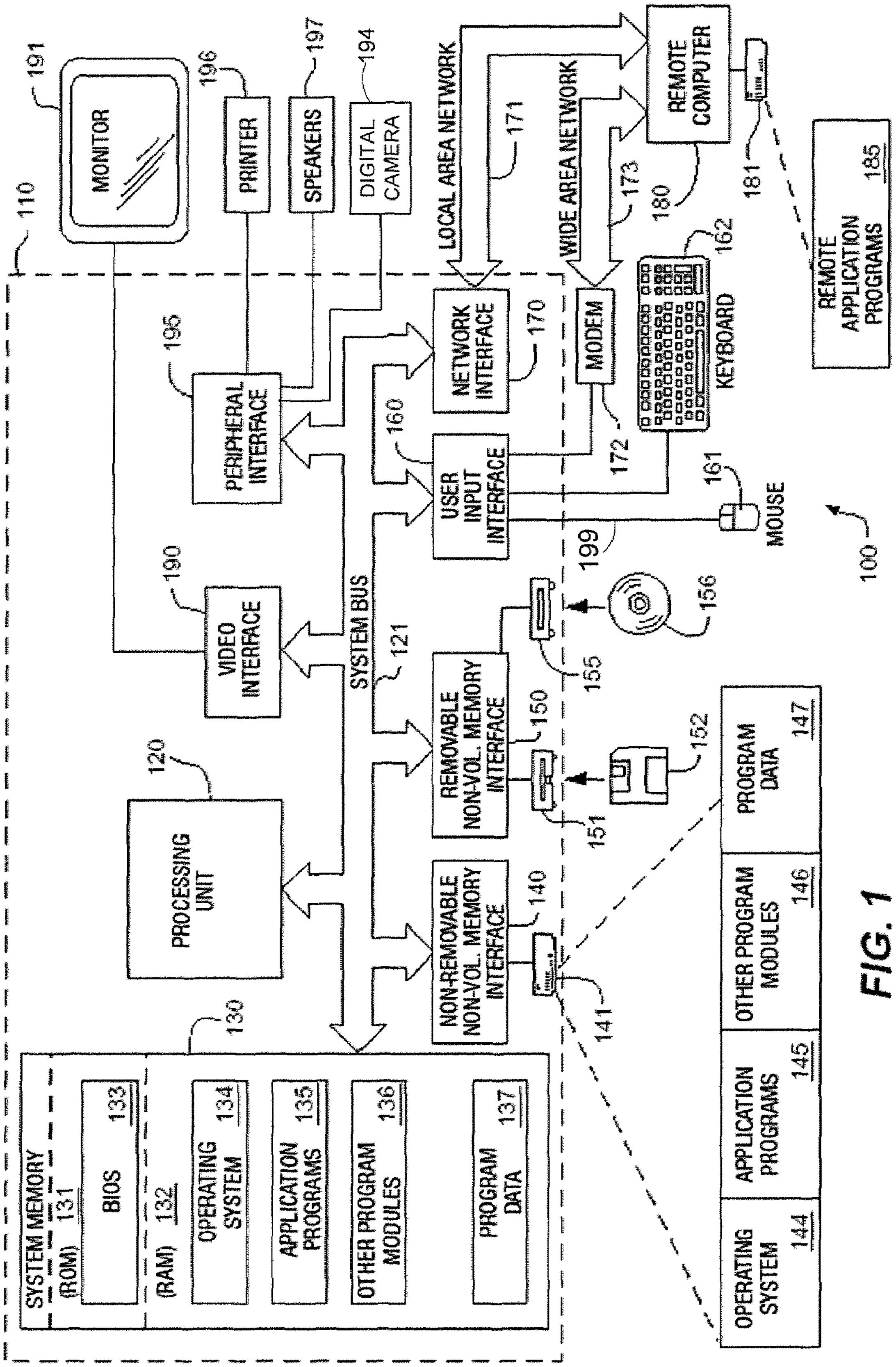
FIG. 1 illustrates an example of a suitable computing system environment on which the invention may be implemented.

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Definitions for the following terms are included to facilitate an understanding of the detailed description.

Channel—Images contain one or more 'channels' of information. Commonly colors are represented by the additive primary colors (red, green and blue). Color information for each of these three colors would be encoded into its own channel. Channels are not limited to RGB—they can be broken into luminance (brightness) and chrominance (color) channels, or other still-more-exotic ways. Channels may also be used to encode things other than color—transparency, for example. A measure of the color quality of an image is the number of bits used to encode per channel (bpch).

Clipping—Any time two different values in the source data are mapped to the same value in the destination data, the values are said to be clipped. This is significant because clipped data cannot be restored to its original state—information has been lost. Operations such as changing brightness or contrast may clip data.

Color Management—Color management is the process of ensuring the color recorded by one device is represented as faithfully as possible to the user preference on a different device, often this is match the perception on one device to another. The sensor of an imaging device will have, when compared to the human eye, a limited ability to capture all the color and dynamic range that the human eye can. The same problem occurs on both display devices and with output devices. The problem is that while all three classes of device have these color and dynamic range limitations, none of them will have limitations in exactly the same way. Therefore conversion 'rules' must be set up to preserve as much of the already limited color and dynamic range information as possible, as well as ensure the information appears as realistic as possible to the human eye, as it moves through the workflow.

Color Space—A sensor may detect and record color, but the raw voltage values have absolutely no meaning without a reference. The reference scale could be the measured capabilities of the sensor itself—if the sensor is measured to have a particular frequency response spectrum, then numbers generated will have meaning. More useful, though, would be a common reference, representing all the colors visible by the human eye. With such a reference (a color space known as CIELAB), a color could be represented unambiguously, and other devices could consume this information and do their best to reproduce it. There are a variety of well-known color spaces, including sRGB, scRGB, AdobeRGB, each developed for specific purposes within the world of imaging.

Color Context—A generalized form of a gamut in a described color space. While certain file formats make use of gamut information as described by a particular color management standard, a color context is effectively the same concept but includes those file (encoding) formats which do not support ICC gamuts.

Dynamic Range—Mathematically, the largest value signal a system is capable of encoding divided by the smallest value signal that same system is capable of encoding. This value gives a representation of the scale of the information the system will encode.

Gamut—The range of colors and density values reproducible in an output device such as printer or monitor Hue—An attribute of a color by which a person perceives a dominant wavelength.

Hue Saturation Value (HSV)—A hue diagram representing hue as an angle and saturation as a distance from the center.

ICC—International Color Consortium

Intensity—The sheer amount of light from a surface or light source, without regard to how the observer perceives it.

Precision—An accuracy of representing a color. The accuracy typically increases by increasing the number of bits that is encoded with each channel, providing that the source data has adequate color resolution.

Profile—A file that contains enough information to let a color management system convert colors into and out of a specific color space. This may be a device's color space—in which we would call it a device profile, with subcategories input profile, output profile, and display profile (for input, output, and display devices respectively); or an abstract color space.

Rendering Intent—The setting that tells the color management system how to handle the issue of converting color between color spaces when going from a larger gamut to a smaller one.

Saturation—The purity of color.

sRGB—A "standard" RGB color space intended for images on the Internet, IEC 61966-2-1 scRGB—"standard computing" RGB color space, IEC 61966-2-2

Workflow—A process of defining what colors that the numbers in a document represent and preserving or controlling those colors as the work flows from capture, through editing, to output.

FIG. 1 illustrates an example of a suitable computing system environment 100 on which the invention may be implemented. In particular, FIG. 1 shows an operation of a wireless pointer device 161, e.g., an optical wireless mouse, in the context of computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and wireless pointing device 161, commonly referred to as a mouse, trackball or touch pad. In an embodiment of the invention, wireless pointing device 161 may be implemented as a mouse with an optical sensor for detecting movement of the mouse. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). In FIG. 1, wireless pointer 161 communicates with user input interface 160 over a wireless channel 199. Wireless channel 199 utilizes an electromagnetic signal, e.g., a radio frequency (RF) signal, an infrared signal, or a visible light signal. A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A peripheral interface 195 may interface to a video input device such as a scanner (not shown) or a digital camera 194, where output peripheral interface may support a standardized interface, including a universal serial bus (USB) interface. Color management, which may be supported by operating system 134 or by an application 135, assists the user in obtaining a desired color conversion between computer devices. The computer devices are typically classified as input devices, e.g. digital camera 194, display devices, e.g., monitor 191, and output devices, e.g., printer 196. Operation of color management is explained in greater detail in the following discussion.

Figure 2:
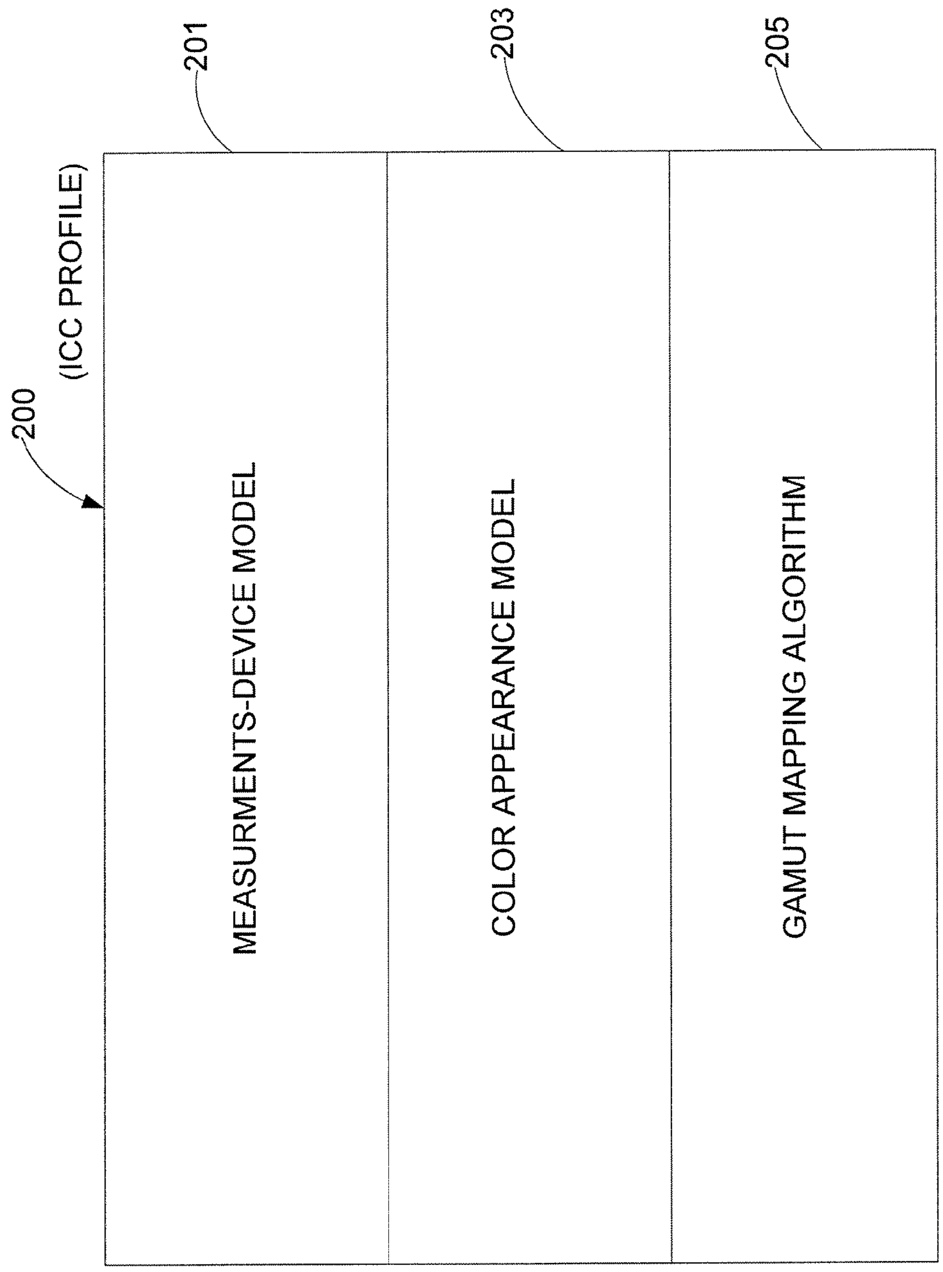
FIG. 2 illustrates an International Color Consortium (ICC) profile that is supported by an embodiment of the invention.

FIG. 2 illustrates an International Color Consortium (ICC) profile 200 that is supported by an embodiment of the invention. ICC profile 200 contains measurements-device model segment 201, color appearance model segment 203, and gamut mapping algorithm segment 205. In the embodiment, profile 200 complies with ICC Specification versions 3.0 through 4.0 that are available from the ICC website (http://www.color.org.) Measurements-device model segment 201 characterizes the device with a plurality of colorimetric values as well as with information about illumination. Color appearance model segment 203 is used to transform the colorimetric values, based on the input illumination and viewing environment, into the profile connection space (PCS). The corresponding color appearance model is often proprietary. Gamut mapping algorithm segment 205 accounts for differences in the color gamut between the reference medium and the specific output device. With ICC profile 200, gamut mapping algorithm segment 205 assumes that the source profile connection space is equivalent to the destination profile connection space. ICC profile 200 exemplifies a legacy format of a profile as referenced in the subsequent discussion.

ICC profile 200 is typically represented in a binary format that assumes a “black box” approach. Consequently, a user may conclude that ICC profile 200 has significant shortcomings that may be addressed by other profile formats.

Figure 3:
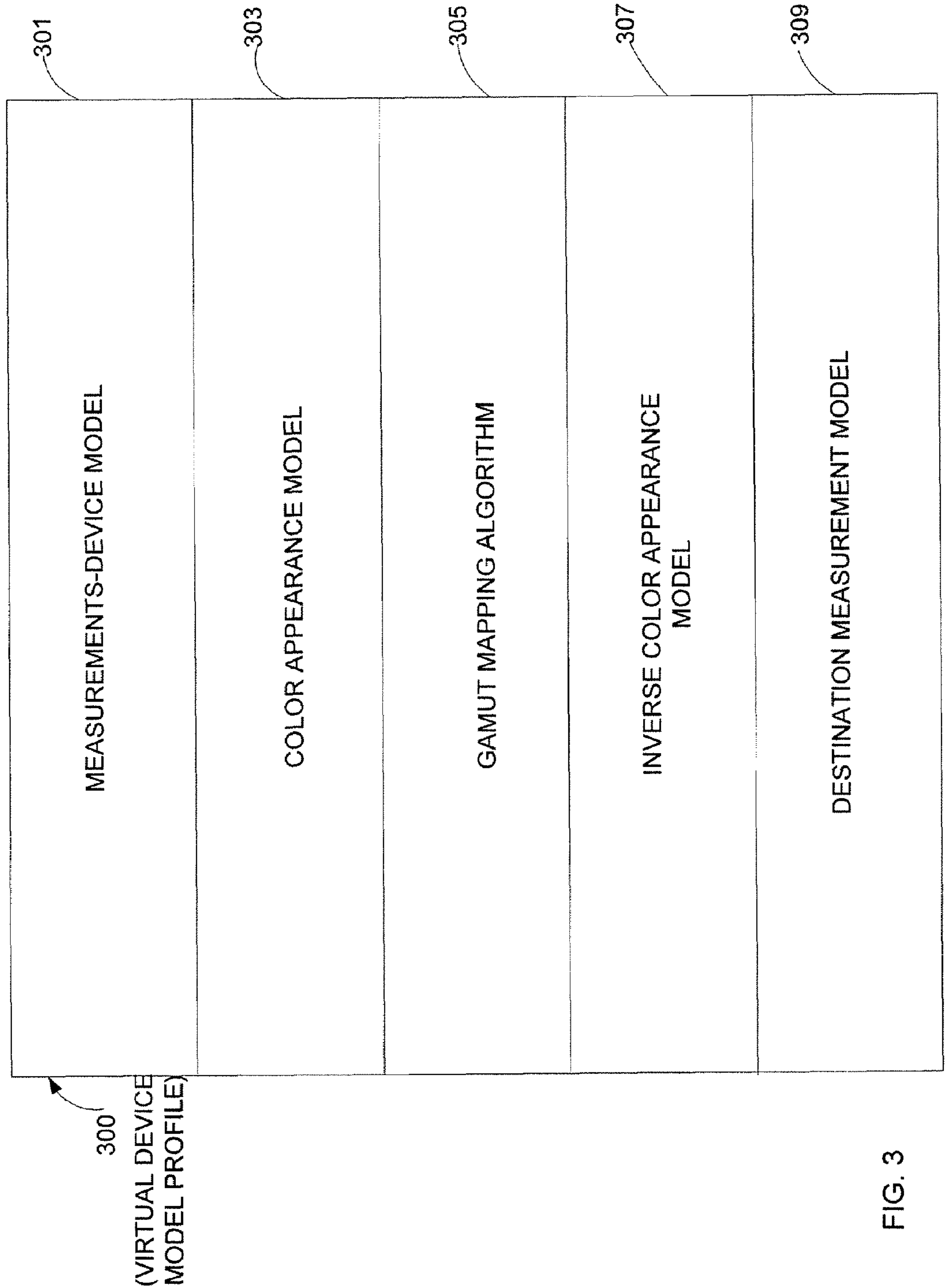
FIG. 3 illustrates a virtual device model profile that is supported by an embodiment of the invention.

FIG. 3 illustrates a virtual device model profile 300 that is supported by an embodiment of the invention. Virtual device model profile 300 resolves some of the shortcomings associated with ICC profile 200. Virtual device model profile 300 contains measurements-device model segment 301, color appearance model segment 303, gamut mapping algorithm segment 305, inverse color appearance model segment 307, and destination measurement model segment 309.

Virtual device model profile 300 has several features that may be advantageous to a user. For example, profile 300 does not assume that the source profile space is equivalent to the destination profile space. The color appearance model (corresponding to color appearance model segment 303 and inverse color appearance model segment 307) need not be proprietary and may utilize a CIE-based color appearance model. Also, profile 300 may be more accessible by using a text format (e.g. Extensible Markup Language (XML)) rather than a binary format that is used by ICC profile 200. Virtual device model profile 300 exemplifies an advanced profile format as referenced in the subsequent discussion.

Figure 4:
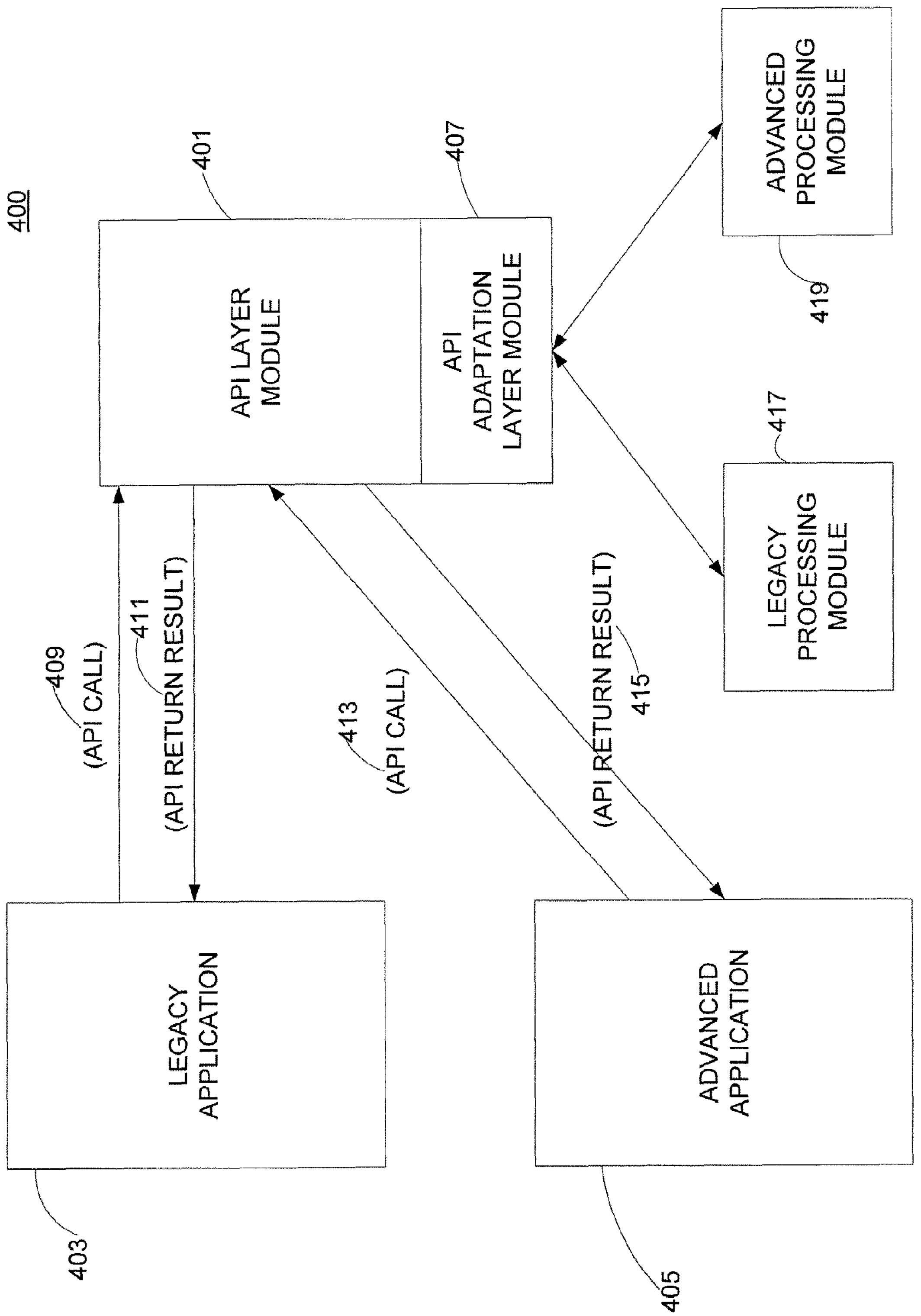
FIG. 4 illustrates an architecture of a color management system in accordance with an embodiment of the invention.

FIG. 4 illustrates an architecture 400 of a color management system in accordance with an embodiment of the invention. The color management system comprises API layer module 401, API adaptation layer module 407, legacy processing module 417, and advanced processing module 419. In the embodiment, API layer module 401 and API adaptation layer module 407 support a legacy API set, e.g., Image Color Management 2 (ICM2).

ICM2 is built into Windows® 98 and higher. ICM2 supports a legacy application program interface (API) set that has different API categories, including:

OPEN/CLOSE profile

GET/SET profile element

CREATE TRANSFORM

TRANSFORM COLORS

An API call typically contains at least one parameter. A parameter may be a pointer that identifies an object, e.g. a profile object or a transform object. The OPEN category of the API set enables designated profile to be accessed by an application. Once the designated category is opened, profile elements may be read or written by an application using the GET/SET category of the API set. In order for a color management system to transform a source image into a destination image, a transform lookup table (which is typically multi-dimensional) is constructed from a designated set of profiles, e.g., a source profile and a destination profile. An application can invoke the construction of the lookup table by utilizing the CREATE TRANSFORM category. Once the lookup table is constructed, the color management system can be instructed by an application to transform a source image to a destination image, pixel by pixel, by utilizing the TRANSFORM COLORS category of the API set.

Referring to FIG. 4, legacy application 403 and advanced application 405 interact with API layer module 401 to determine which processing module should process an API request. Both applications 403 and 405 send API requests to API layer module 401. While the structure and format of API call 409, API return result 411, API call 413, and API return result 415 are compliant with the legacy format, advanced application 405 can utilize capabilities and enhancements provided by advanced processing module 419. However, legacy application 403 can continue to utilize the legacy API set without any modifications. For example, advanced application 405 may utilize virtual device model profile 300 to represent one or more the designated profiles in an API call. API adaptation layer module 407 analyzes an object that is identified in an API call to determine if the object has a legacy format (e.g., ICC profile 200) or if the object has an advanced format (e.g., virtual device model profile 300). (The advanced format may be defined as a non-legacy format.) If the objects have a legacy format, then legacy processing module 417 processes the API call. If the objects have an advanced format, then advanced processing module 419 processes the API call.

If the objects of a set of objects that are identified by the API call have mixed formats, i.e., one of the objects has a legacy format and another object has an advanced format, the formats of some of the objects are converted so that the formats of all of the objects are consistent. As an example, if the destination profile and the source profile have different formats (where one profile has a legacy format and the other profile has an advanced format), the format of the object having a legacy format is converted to an advanced format. In the embodiment, API adaptation layer module 407 utilizes the logic shown in Table 1 to determine format conversion. (In other embodiments of the invention, format conversion may be performed by other modules of a color management system.)

TABLE 1

| PROFILE MISMATCH | | |
|---|---|---|
| SOURCE PROFILE | DESTINATION PROFILE | PROCESSING MODULE |
| LEGACY | LEGACY | LEGACY (MODULE 417) |
| LEGACY → ADVANCED | ADVANCED | ADVANCED (MODULE 419) |
| ADVANCED | LEGACY → ADVANCED | ADVANCED (MODULE 419) |
| ADVANCED | ADVANCED | ADVANCED (MODULE 419) |

In the embodiment illustrated in Table 1, if any object in a set of objects is associated with the advanced format, then any remaining object of the set having the legacy format is converted to the advanced format so that all the objects of the set have the advanced format after format conversion. Advanced module 419 is subsequently invoked to process the API call.

In the embodiment, as illustrated in Table 1, if all objects in the set of objects are associated with the legacy format, then none of the objects are converted to the advanced format. Legacy module 417 is subsequently invoked to process the API call. However, in another embodiment, a format override indicator may be configured (corresponding to a "only-advanced format"), through a policy, so that all objects having a legacy format are converted to the advanced format, regardless whether any object of the set of objects is associated with the advanced format. Moreover, the policy may support a plurality of mode selections for configuring the format override indicator (corresponding to a "prefer advanced format" so that all legacy objects are not unconditionally converted to an advanced format, i.e., as described above, the legacy objects are converted to the advanced format only if at least one object has the advanced format. The embodiment may support other mode selections, e.g., a "only-legacy format" and a "prefer legacy format". Table 2 illustrates operation in accordance with these mode selections.

TABLE 2

MODE SELECTIONS FOR FORMAT OVERRIDE INDICATOR

| MODE SELECTION | OBJECT FORMAT | CONDITIONS |
|---|---|---|
| prefer advanced format | legacy → advanced | if at least one object of object set has advanced format |
| prefer legacy format | advanced → legacy | if at least one object of object set has legacy format |
| only-advanced format | legacy → advanced | unconditional |
| only-legacy format | advanced → legacy | unconditional |

While the embodiment converts an object from a legacy format to an advanced format, other embodiments may convert the object from an advanced format to a legacy format. However, legacy software is typically frozen while updates are incorporated in non-legacy software. That being the case, it may be advantageous to convert a legacy format to an advanced format as shown in Table 1 in order to avoid a modification of the legacy software.

Figure 5:
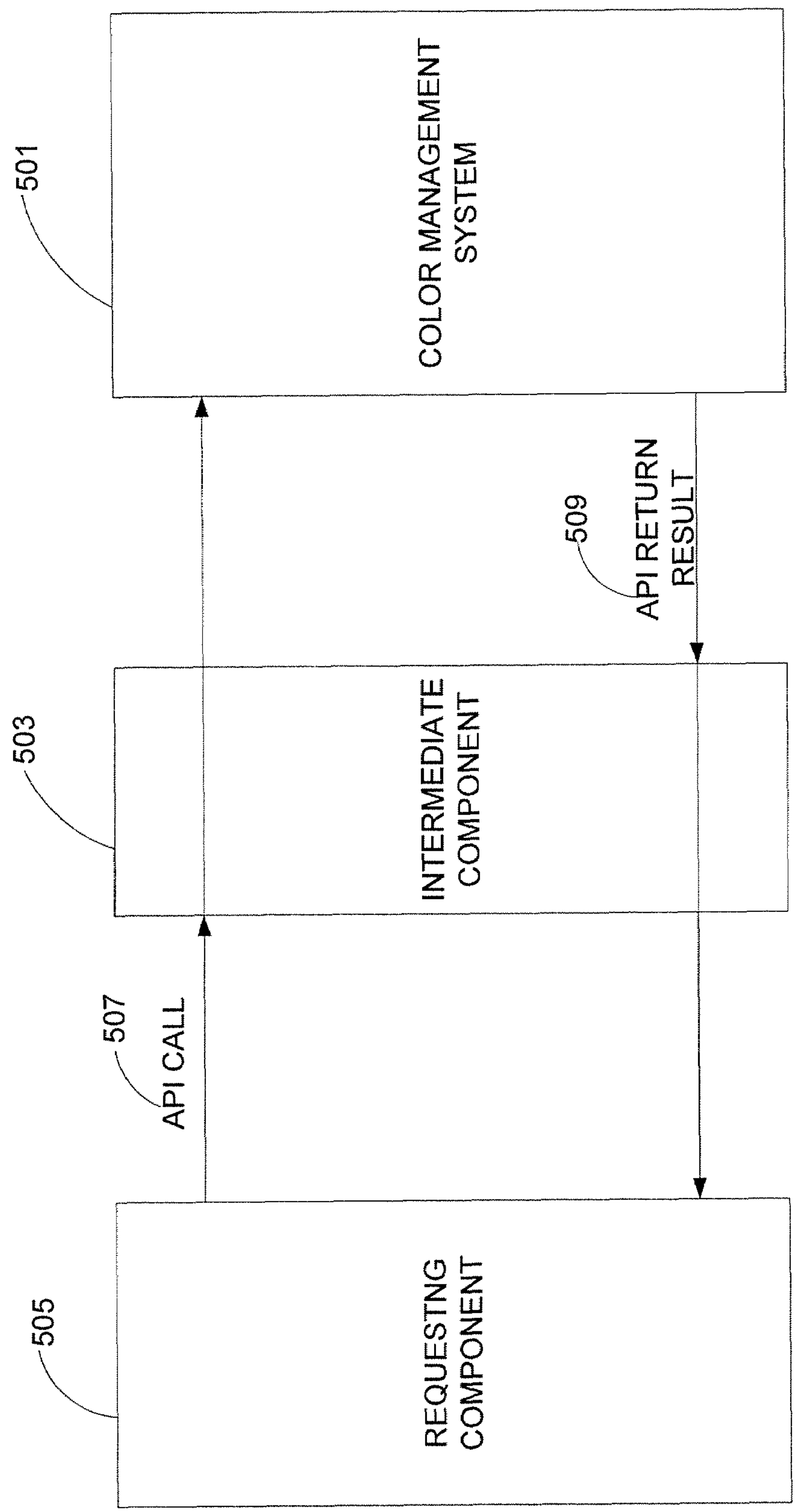
FIG. 5 illustrates a requesting component invoking an API call to a color management system through an intermediate component in accordance with an embodiment of the invention.

FIG. 5 illustrates a requesting component 505 invoking an API call 507 to a color management system 501 through an intermediate component 503 in accordance with an embodiment of the invention. In the configuration shown in FIG. 5, intermediate component 503 relays API call 507 to color management system 501 and relays API return result 509 from color management system 501 to requesting component 505. In the embodiment, intermediate component 503 may be an application or a utility.

Figure 6:
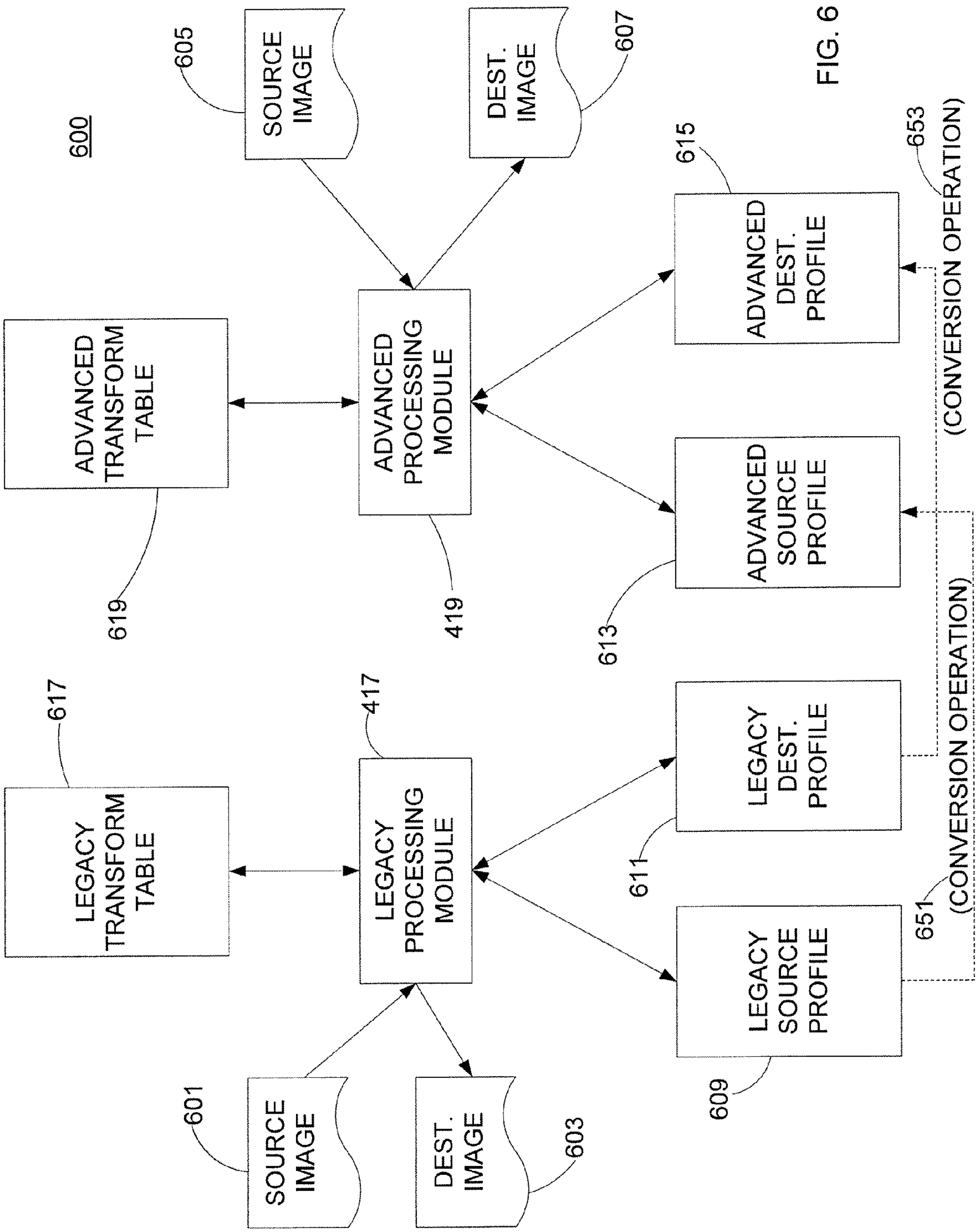
FIG. 6 illustrates an architecture of a color management system transforming color information from a source image document to a destination image document in accordance with an embodiment of the invention.

FIG. 6 illustrates an architecture of a color management system 600 transforming color information from a source image document 601 or 605 to a destination image document 603 or 607 in accordance with an embodiment of the invention. Color management system 600 comprises legacy module 417, advanced processing module 419, and a plurality of structures that support different objects that associated with color management operations. In the embodiment, structures 609, 611, 613, and 615 are separately associated with the legacy format (legacy source profile 609, legacy destination profile 611, and legacy transform table 617) and with the advanced format (advanced source profile 613, advanced destination profile 615, and advanced transform table 619). If necessary, as discussed above, legacy source profile 609 is converted to advanced source profile 613 through format conversion 651 and legacy destination profile 611 is converted to advanced destination profile 615 through format conversion 653.

Figure 7:
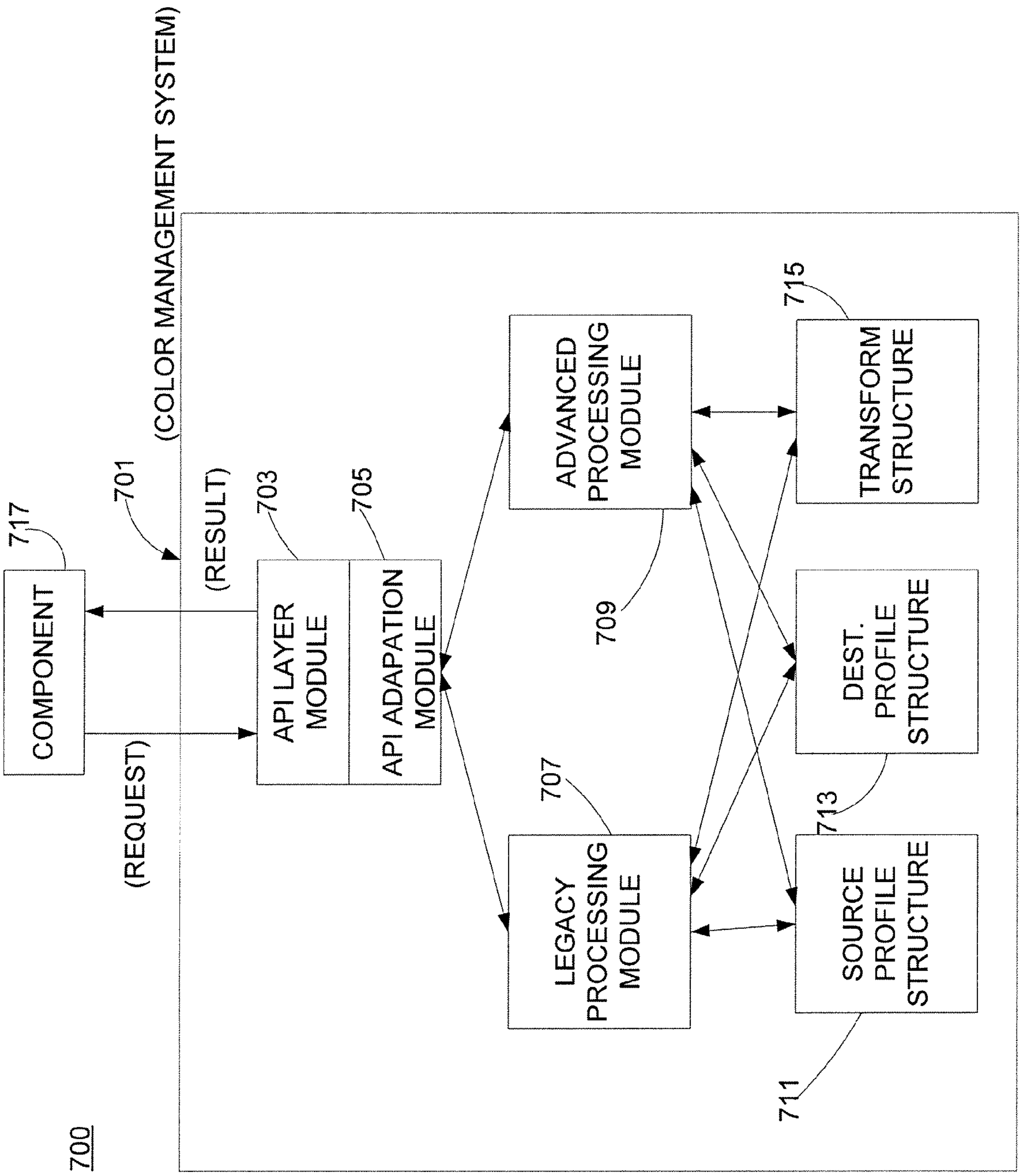
FIG. 7 illustrates an architecture of a color management system that utilizes common structures for processing image documents in accordance with an embodiment of the invention.

FIG. 7 illustrates an architecture 700 of a color management system 701 that utilizes common structures for processing image documents in accordance with an embodiment of the invention. Legacy processing module 707, advanced processing module 709, API layer module 703, and API adaptation module 705 correspond to legacy processing module 417, advanced processing module 419, API layer module 401, and API adaptation layer module 407, respectively, as shown in FIG. 4. Component 717 requests a color operation with an API call. Architecture 700 supports a common structure for an object either with a legacy format or an advanced format. For example, source profile structure 711, destination profile structure 713, and transform structure 715 support a legacy format or an advanced format for a source profile, a destination profile, and a transform look-up table, respectively. In the embodiment, structures 711, 713, and 715 utilize handles to identify elements of the object, in which a null pointer is indicative of an element corresponding to a format that is different from the format of the object. (A handle is a pointer to a pointer.) However, another embodiment of the invention may utilize another identification mechanism, e.g., pointers.

Figure 8:
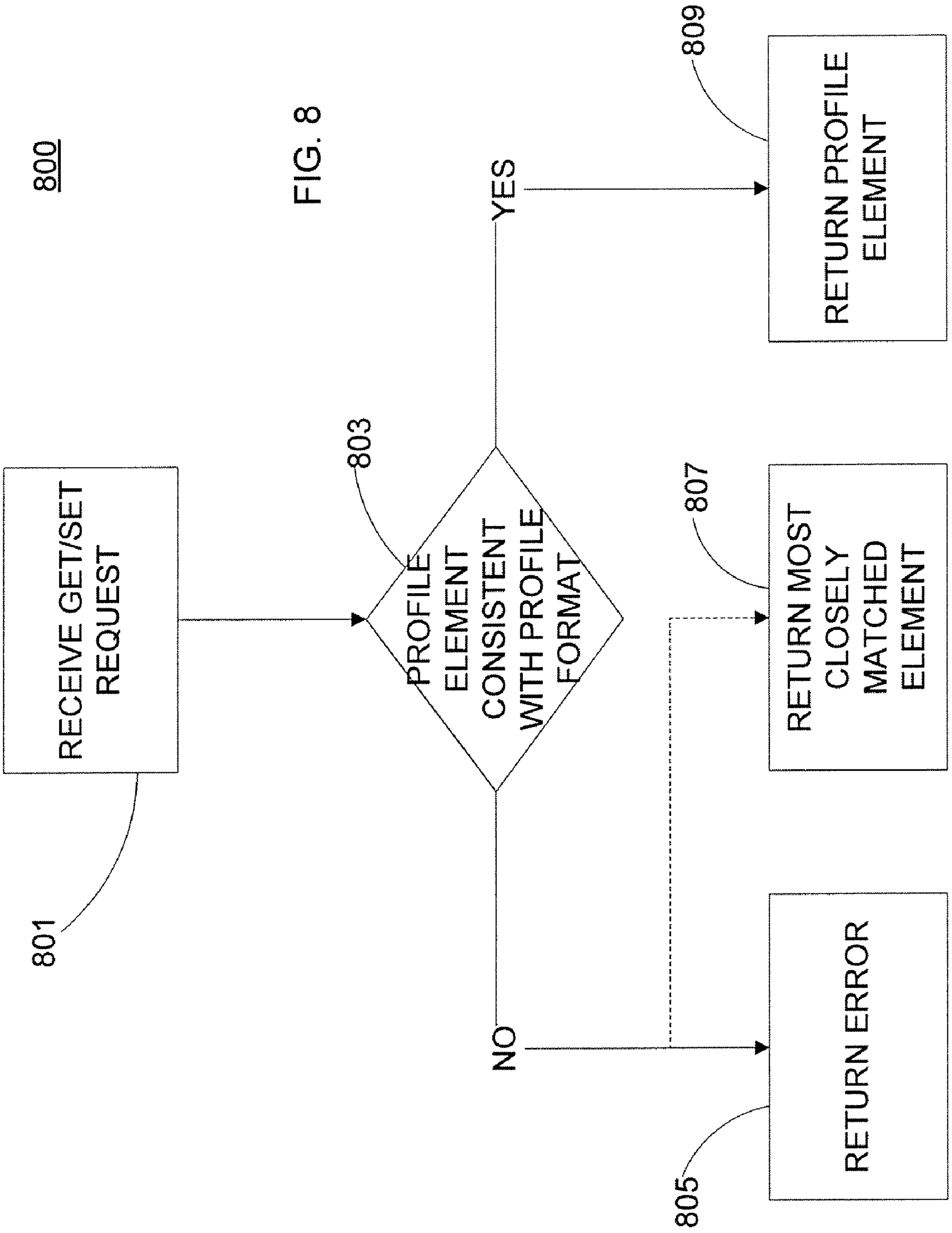
FIG. 8 shows a flow diagram for processing a GET/SET API category in accordance with an embodiment of the invention.

FIG. 8 shows a flow diagram 800 for processing a GET/SET API category in accordance with an embodiment of the invention. As previously discussed, the GET/SET category enables an application to retrieve or to set a profile element. In flow diagram 800, a designated profile may have a legacy format or an advanced format. In step 801, a color management system receives an API call to retrieve or to set an element of the profile. In step 803, the color management system determines if the requested element is consistent with the profile format. An element may be supported with the legacy format but may not be supported with the advanced format or vise versa. For example, a "preferred CMM" element may be supported with ICC format 200 but not with virtual device model profile 300. If step 803 determines that the profile element is consistent with the profile format, the element is returned in step 809. If step 803 determines that the profile element is not consistent with the profile format, an error indication is returned. In another embodiment, rather than the color management system returning an error indication, the color management system determines a profile element (that is corresponds to the profile format) that best matches the requested profile element, and returns information about the matched profile element in step 807.

While the embodiments illustrated in FIGS. 4-7 support an application program interface between a component and a color management system, the invention may support system enhancements with a legacy API set for other types of systems. Consequently, a legacy API can support enhancements and new capabilities of the system while enabling a legacy application to continue interacting with the system without modifications to the legacy application.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 9:
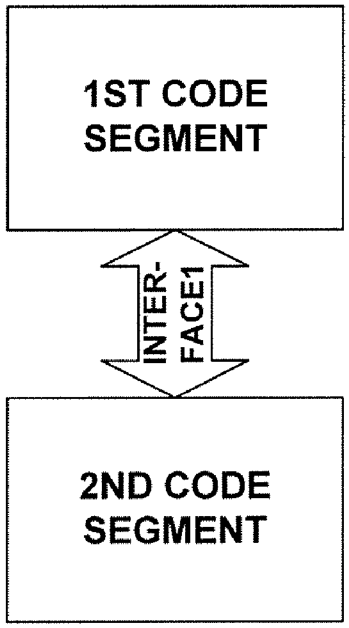
FIG. 9 illustrates an interface as a conduit through which first and second code segments communicate.
Figure 10:
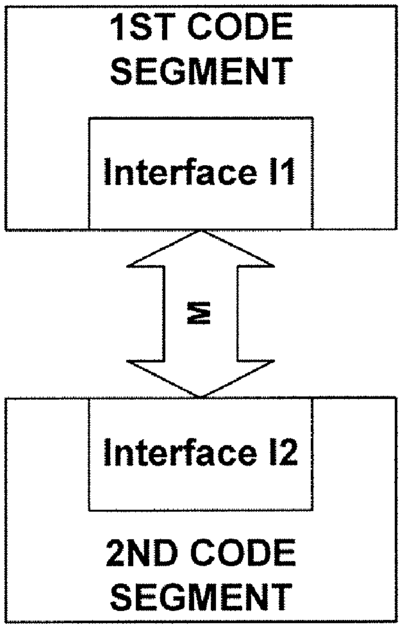
FIG. 10 illustrates an interface as comprising interface objects.

Notionally, a programming interface may be viewed generically, as shown in FIG. 9 or FIG. 10. FIG. 9 illustrates an interface Interface1 as a conduit through which first and second code segments communicate. FIG. 10 illustrates an interface as comprising interface objects I1 and I2 (which may or may not be part of the first and second code segments), which enable first and second code segments of a system to communicate via medium M. In the view of FIG. 10, one may consider interface objects I1 and I2 as separate interfaces of the same system and one may also consider that objects I1 and I2 plus medium M comprise the interface. Although FIGS. 9 and 10 show bidirectional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 9 and 10, but they nonetheless perform a similar function to accomplish the same overall result. We will now briefly describe some illustrative alternative implementations of a programming interface.

Figure 11:
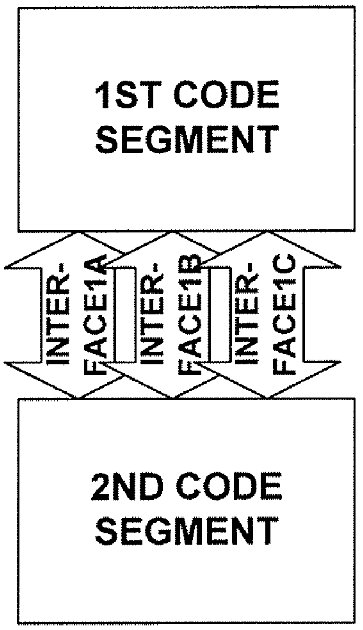
FIG. 11 illustrates a function provided by an interface that may be subdivided to convert communications of the interface into multiple interfaces.
Figure 12:
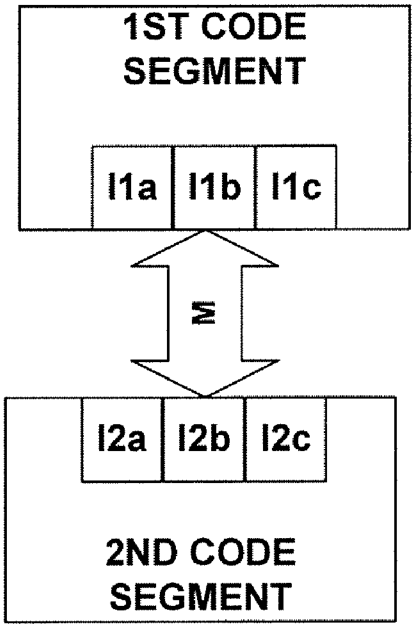
FIG. 12 illustrates a function provided by an interface that may be subdivided into multiple interfaces in order to achieve the same result as the function illustrated in FIG. 11.

A communication from one code segment to another may be accomplished indirectly by breaking the communication into multiple discrete communications. This is depicted schematically in FIGS. 11 and 12. As shown, some interfaces can be described in terms of divisible sets of functionality. Thus, the interface functionality of FIGS. 9 and 10 may be factored to achieve the same result, just as one may mathematically provide 24, or 2 times 2 time 3 times 2. Accordingly, as illustrated in FIG. 11, the function provided by interface Interface1 may be subdivided to convert the communications of the interface into multiple interfaces Interface1A, Interface 1B, Interface 1C, etc. while achieving the same result. As illustrated in FIG. 12, the function provided by interface I1 may be subdivided into multiple interfaces I1*a*, I1*b*, I1*c*, etc. while achieving the same result. Similarly, interface I2 of the second code segment which receives information from the first code segment may be factored into multiple interfaces I2*a*, I2*b*, I2*c*, etc. When factoring, the number of interfaces included with the $1^{st}$ code segment need not match the number of interfaces included with the $2^{nd}$ code segment. In either of the cases of FIGS. 11 and 12, the functional spirit of interfaces Interface1 and I1 remain the same as with FIGS. 9 and 10, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 13:
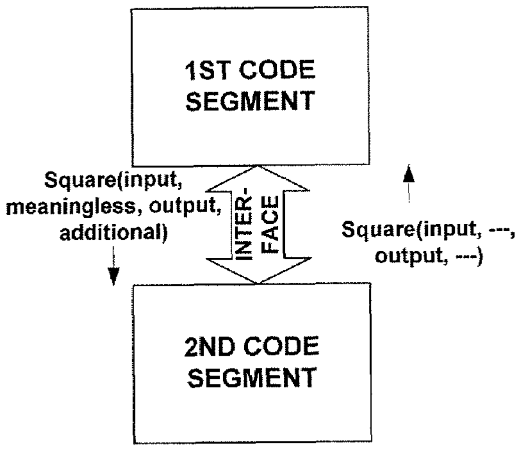
FIG. 13 illustrates an example of ignoring, adding, or redefining aspects of a programming interface while still accomplishing the same result.
Figure 14:
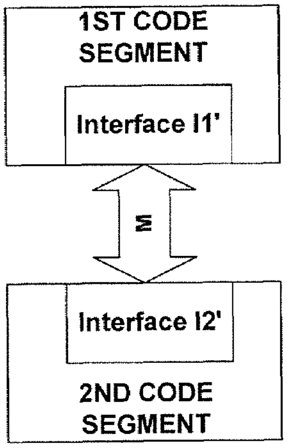
FIG. 14 illustrates another example of ignoring, adding, or redefining aspects of a programming interface while still accomplishing the same result.

In some cases, it may be possible to ignore, add or redefine certain aspects (e.g., parameters) of a programming interface while still accomplishing the intended result. This is illustrated in FIGS. 13 and 14. For example, assume interface Interface1 of FIG. 9 includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 13, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 14, interface I1 is replaced by interface I1, redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

Figure 15:
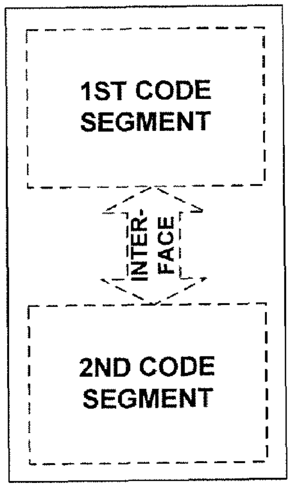
FIG. 15 illustrates merging code segments in relation to the example that is shown in FIG. 9.
Figure 16:
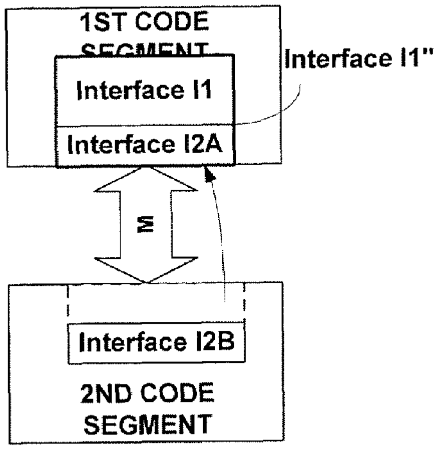
FIG. 16 illustrates merging interfaces in relation to the example that is shown in FIG. 10.

It may also be feasible to merge some or all of the functionality of two separate code modules such that the "interface" between them changes form. For example, the functionality of FIGS. 9 and 10 may be converted to the functionality of FIGS. 15 and 16, respectively. In FIG. 15, the previous 1st and 2nd Code Segments of FIG. 9 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 16, part (or all) of interface I2 from FIG. 10 may be written inline into interface I1 to form interface I1". As illustrated, interface I2 is divided into I2*a* and I2*b*, and interface portion I2*a* has been coded in-line with interface I1 to form interface I1". For a concrete example, consider that the interface I1 from FIG. 10 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Figure 18:
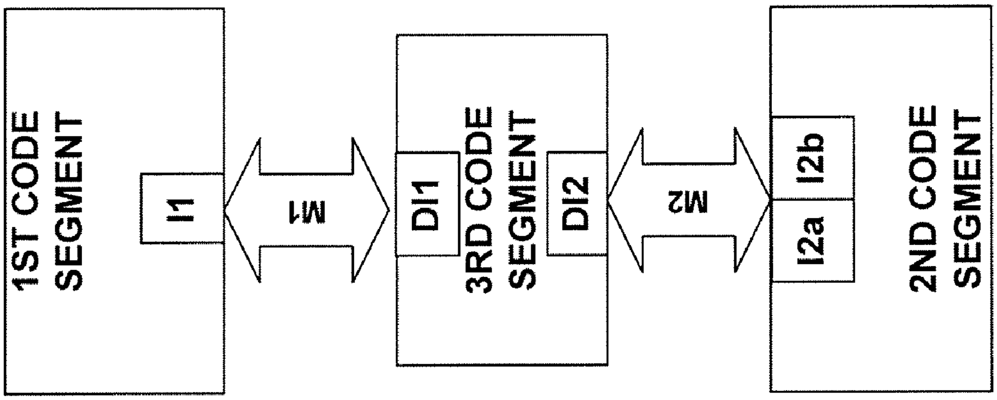
FIG. 18 illustrates a code segment that is associated with a divorce interface.
Figure 17:
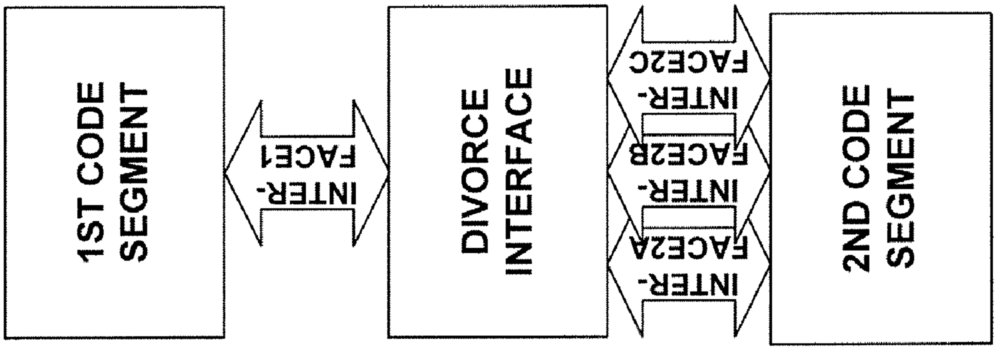
FIG. 17 illustrates middleware that converts communications to conform to a different interface.

A communication from one code segment to another may be accomplished indirectly by breaking the communication into multiple discrete communications. This is depicted schematically in FIGS. 17 and 18. As shown in FIG. 17, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 18, a third code segment can be introduced with divorce interface DI1 to receive the communications from interface I1 and with divorce interface DI2 to transmit the interface functionality to, for example, interfaces I2*a* and I2*b*, redesigned to work with DI2, but to provide the same functional result. Similarly, DI1 and DI2 may work together to translate the functionality of interfaces I1 and I2 of FIG. 10 to a new operating system, while providing the same or similar functional result.

Figure 19:
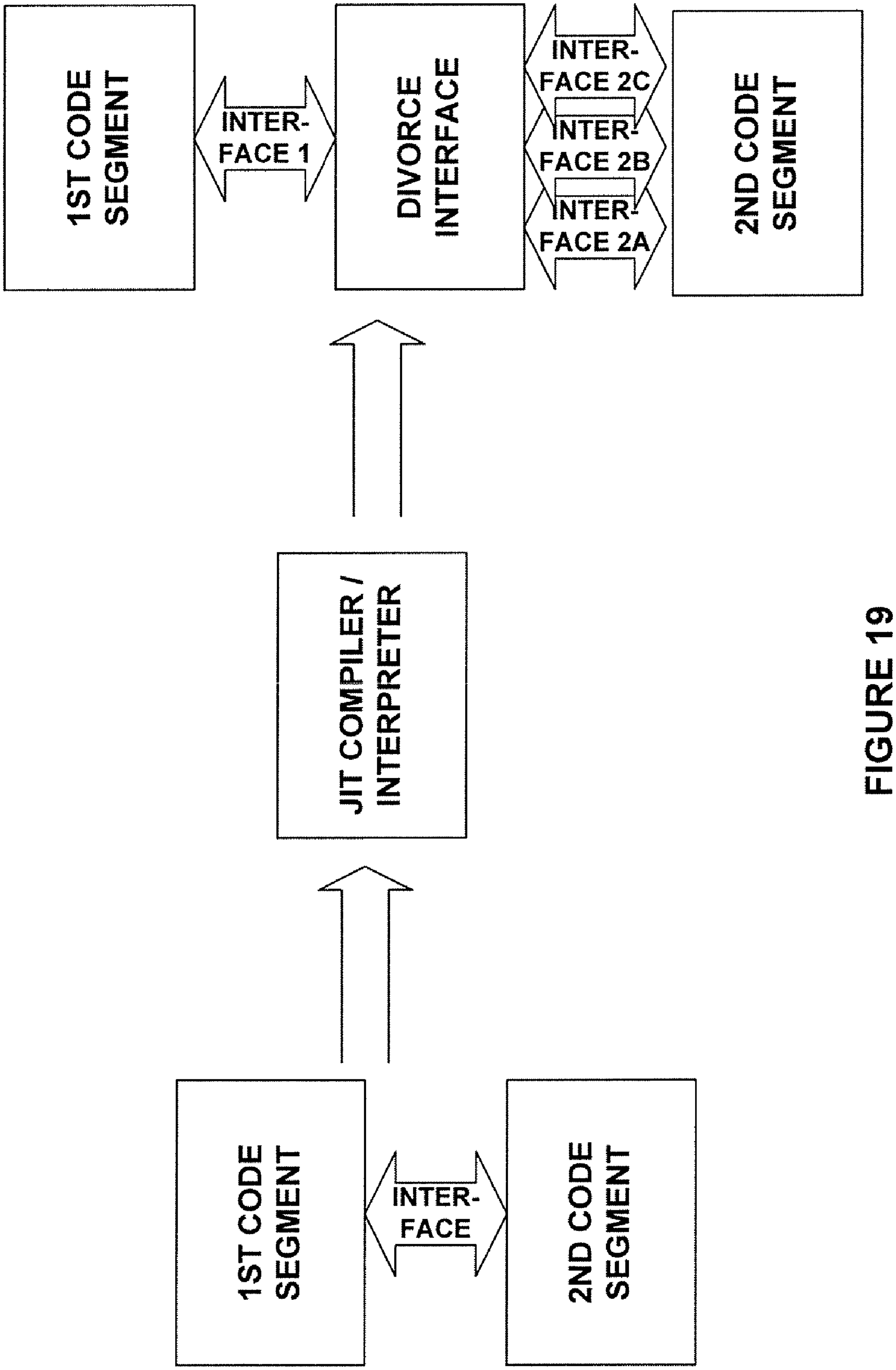
FIG. 19 illustrates an example in which an installed base of applications is designed to communicate with an operating system in accordance with an interface protocol, in which the operating system is changed to use a different interface.
Figure 20:
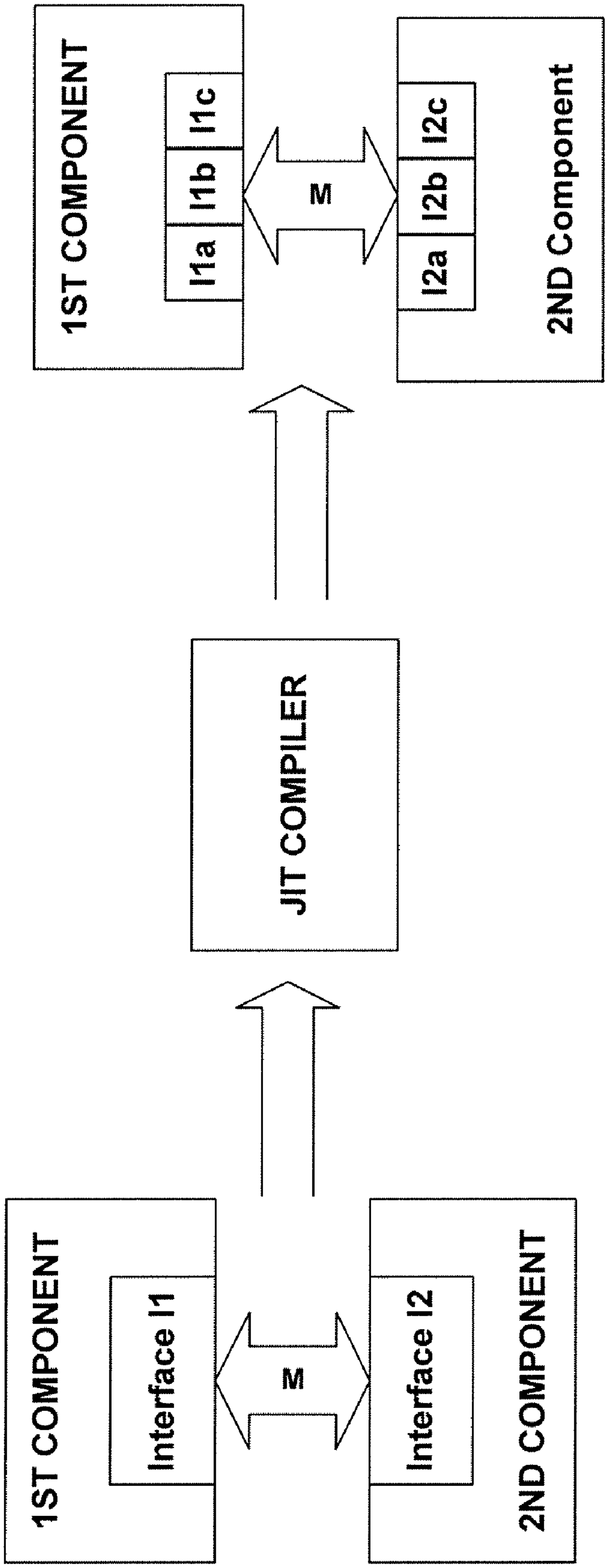
FIG. 20 illustrates rewriting interfaces to dynamically factor or otherwise alter the interfaces.

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 19 and 20. As can be seen in FIG. 19, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 20, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 9 and 10. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method for supporting a request from a component performed by one or more computers of a color management system, the method comprising:

(a) receiving the request, wherein the request is associated with a color management operation and is compliant with a legacy version of the request, the request identifying a set of objects;

(b) if the set of objects is characterized by mixed formats, converting at least one object of the set of objects in accordance with a format override indicator, wherein all objects are associated with a same format, and wherein the format override indicator corresponds to one of a plurality of mode selections that are supported by a policy;

(c) if the same format corresponds to a legacy format, invoking a legacy processing module to process the request;

(d) if the same format corresponds to an advanced format, invoking an advanced processing module to process the request; and (e) returning a result to the component, the result being associated with the color management operation, wherein an object of the set of objects corresponds to a profile and the request instructs that a requested element of the profile be accessed, and wherein (e) comprises:

(i) if the requested element is compatible with a format of the profile, returning a result of the color management operation performed upon the requested element; and (ii) if the requested element is not compatible with the format of the profile, determining whether a different element of the profile exists that matches the requested element;

if the different element of the profile does not exist, returning an error indication; and if the different element exists, returning a result of the color management operation performed upon the different element, wherein the different element is compatible with the format of the profile.

2. The method of claim 1, wherein one of the set of objects corresponds to a profile.

3. The method of claim 2, wherein the legacy format complies with an International Color Consortium (ICC) format.

4. The method of claim 2, wherein the advanced format complies with a virtual device model profile.

5. The method of claim 1, wherein the request comprises an application program interface (API) call.

6. The method of claim 5, wherein a category of the API call is selected from the group consisting of an open profile category, a close profile category, a get profile element category, a set profile element category, a create transform category, and a transform colors category.

7. The method of claim 5, wherein the API call complies with Image Color Management (ICM).

8. The method of claim 1, wherein the component is a requesting component that initiates the request.

9. The method of claim 1, wherein the component is an intermediate component that relays the request to a color management system.

* * * * *